United States Patent
Liang

(10) Patent No.: US 10,831,045 B2
(45) Date of Patent: Nov. 10, 2020

(54) DISPLAY PANEL AND METHOD FOR MANUFACTURING THE SAME, DISPLAY DEVICE

(71) Applicant: BOE TECHNOLOGY GROUP CO., LTD., Beijing (CN)

(72) Inventor: Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 142 days.

(21) Appl. No.: 15/749,284

(22) PCT Filed: Jun. 29, 2017

(86) PCT No.: PCT/CN2017/090867
§ 371 (c)(1),
(2) Date: Jan. 31, 2018

(87) PCT Pub. No.: WO2018/076750
PCT Pub. Date: May 3, 2018

(65) Prior Publication Data
US 2019/0011764 A1    Jan. 10, 2019

(30) Foreign Application Priority Data
Oct. 28, 2016    (CN) .......................... 2016 1 0967160

(51) Int. Cl.
*G02F 1/03*        (2006.01)
*G02F 1/1343*      (2006.01)
(Continued)

(52) U.S. Cl.
CPC ...... *G02F 1/0305* (2013.01); *G02F 1/133512* (2013.01); *G02F 1/133514* (2013.01);
(Continued)

(58) Field of Classification Search
CPC ......... G02F 1/133512; G02F 1/133514; G02F 1/134136; G02F 2001/136222; G02F 1/0305
See application file for complete search history.

(56) References Cited

U.S. PATENT DOCUMENTS 6,169,594 B1    1/2001  Aye et al.
2007/0019132 A1* 1/2007  Kim ...................... B29C 43/021
                                                349/95
(Continued)

FOREIGN PATENT DOCUMENTS

CN          1320223 A      10/2001
CN          103018931 A     4/2013
(Continued)

OTHER PUBLICATIONS

International Search Report dated Sep. 29, 2017.

*Primary Examiner* — Dung T Nguyen
(74) *Attorney, Agent, or Firm* — Dilworth & Barrese, LLP.; Michael J. Musella, Esq.

(57) ABSTRACT

A display panel and a method for manufacturing the same, and a display device, and the display panel includes a first electrode layer and a second electrode layer; a first matrix including a plurality of grooves; and a second matrix, disposed in the grooves of the first matrix; the grooves are shaped so as to enable total reflection of light which is incident incident from the second matrix or the first matrix to an interface between the second matrix and the first matrix, and at least one of the first matrix and the second matrix is configured to change its refractive index in operation according to a change of a voltage difference between the first electrode layer and the second electrode layer.

20 Claims, 7 Drawing Sheets

(51) Int. Cl.
 *G02F 1/1335* (2006.01)
 *G02F 1/1362* (2006.01)
 *G02F 1/19* (2019.01)

(52) U.S. Cl.
 CPC ........ *G02F 1/134336* (2013.01); *G02F 1/195* (2013.01); *G02F 2001/136222* (2013.01); *G02F 2201/123* (2013.01)

(56) References Cited

U.S. PATENT DOCUMENTS

| | | |
|---|---|---|
| 2012/0075557 A1 | 3/2012 | Hong |
| 2014/0168562 A1 | 6/2014 | Feng et al. |
| 2018/0013359 A1* | 1/2018 | Park .................. H02N 1/04 |
| 2018/0046059 A1 | 2/2018 | Yang et al. |

FOREIGN PATENT DOCUMENTS

| | | |
|---|---|---|
| CN | 105652490 A | 6/2016 |
| CN | 106405950 A | 2/2017 |
| CN | 206178304 U | 5/2017 |

* cited by examiner

DISPLAY PANEL AND METHOD FOR MANUFACTURING THE SAME, DISPLAY DEVICE

TECHNICAL FIELD

Embodiments of the present disclosure relate to a display panel and a method for manufacturing the same, and a display device.

BACKGROUND

Liquid crystal displays (LCDs) are widely used in the field of display. A display panel in a liquid crystal display is generally formed by an array substrate and a counter substrate which cell-assembled together, and the cavity of the cell formed by the array substrate and the counter substrate is filled with liquid crystal. Data lines and gate lines intersecting each other in vertical and horizontal directions are formed on the array substrate. The data lines and the gate lines intersect to form pixel units arranged in an array. For meeting with the needs of consumers, the industry is still exploring new display technologies.

SUMMARY

An embodiment of the present disclosure provides a display panel including: a first electrode layer and a second electrode layer, which are disposed to at least partially overlap with each other; a first matrix comprising a plurality of grooves and disposed between the first electrode layer and the second electrode layer; and a second matrix, disposed in the grooves of the first matrix; wherein the grooves are shaped so as to enable total reflection of light which is incident at least partially perpendicular to the first electrode layer or the second electrode layer and incident from the second matrix or the first matrix to an interface of the second matrix and the first matrix, at least one of the first electrode layer and the second electrode layer is a transparent conductive layer, and at least one of the first matrix and the second matrix is configured to change the refractive index of the at least one in operation according to a change of a voltage difference between the first electrode layer and the second electrode layer.

For example, in the display panel provided in an embodiment of the present disclosure, one of the first matrix and the second matrix is made of a first electro-optical material and the other is made of a fixed refractive index material, and the first electro-optical material is configured to change a refractive index of the first electro-optical material in operation according to the change of the voltage difference between the first electrode layer and the second electrode layer; or one of the first matrix and the second matrix is made of the first electro-optical material and the other is made of a second electro-optical material, and the first electro-optical material and the second electro-optical material are each configured to change refractive indices of the first and second electro-optical materials in operation according to the change of the voltage difference between the first electrode layer and the second electrode layer, and the refractive indices of the first and the second electro-optical materials change by different degrees for a same voltage difference.

For example, in the display panel provided by an embodiment of the present disclosure, the first electro-optical material comprises any one or any combination of lithium niobate, aluminum gallium arsenide, lead lanthanum zirconate titanate, dendrimer, or thiophene multimer; and the second electro-optical material comprises any one or any combination of lithium niobate, aluminum gallium arsenide, lead lanthanum zirconate titanate, dendrimer, or thiophene multimer; and the fixed refractive index material comprises any one or any combination of organic polymer, silicon oxide, silicon nitride, or silicon oxynitride.

For example, in the display panel provided by an embodiment of the present disclosure, the grooves are disposed on a side of the first matrix closer to the second electrode layer, and a cross-sectional area of each groove is decreased in a direction perpendicular to the first electrode layer or the second electrode layer and from the second electrode layer toward the first electrode layer; or the grooves are disposed on a side of the first matrix closer to the first electrode layer, and a cross-sectional area of each groove is decreased in a direction perpendicular to the first electrode layer or the second electrode layer and from the first electrode layer toward the second electrode layer.

For example, in the display panel provided in an embodiment of the present disclosure, shapes of the grooves comprise hemisphere, cone, triangular prism, ellipsoid or partial hemisphere.

For example, the display panel provided in an embodiment of the present disclosure further includes a filter layer, wherein the filter layer is disposed on a side of the first matrix and the second matrix, which side is closer to the first electrode layer or closer to the second electrode layer.

For example, in the display panel provided in an embodiment of the present disclosure, the filter layer is a black filter layer, and the black filter layer is disposed on a side of the first matrix and the second matrix, which side is closer to the first electrode layer.

For example, in the display panel provided in an embodiment of the present disclosure, the filter layer is a patterned color filter layer, and the color filter layer is disposed on a side of the first matrix and the second matrix, which side is closer to the first electrode layer or closer to the second electrode layer.

For example, the display panel provided by an embodiment of the present disclosure further comprises a voltage control circuit, wherein the voltage control circuit is connected to the first electrode layer and the second electrode layer and is configured to apply a first voltage to the first electrode layer and a second voltage to the second electrode layer respectively.

For example, the display panel provided by an embodiment of the present disclosure comprises a plurality of sub-pixel regions arranged in an array, wherein the first electrode layer includes a plurality of first sub-electrodes each in a block shape, the second electrode layer is a planar electrode, and the first sub-electrodes correspond to the sub-pixel regions in one-to-one correspondence; or the second electrode layer includes a plurality of second sub-electrodes each in a block shape, the first electrode layer is a planar electrode, and the second sub-electrodes correspond to the sub-pixel regions in one-to-one correspondence; or the first electrode layer includes a plurality of first sub-electrodes each in a block shape, the second electrode layer includes a plurality of second sub-electrodes each in a block shape, the first sub-electrodes and the second sub-electrodes correspond to the sub-pixel regions in one-to-one correspondence; or the first electrode layer includes a plurality of strip-shaped first sub-electrodes, the second electrode layer includes a plurality of strip-shaped second sub-electrodes, and each of the first sub-electrodes corresponds to a row of the sub-pixel regions, and each of the second sub-electrodes corresponds to a column of the sub-pixel regions; or the first electrode layer includes a plurality of strip-shaped first sub-electrodes, the second electrode layer includes a plurality of strip-shaped second sub-electrodes, and each of the first sub-electrodes corresponds to a column of the sub-pixel regions, and each of the second sub-electrodes corresponds to a row of the sub-pixel regions.

For example, in the display panel provided in an embodiment of the present disclosure, each of the sub-pixel regions corresponds to at least one of the grooves.

An embodiment of the present disclosure further provides a display device, which includes the display panel according to any one of the embodiments of the present disclosure.

An embodiment of the present disclosure further provides a manufacturing method of a display panel including: forming a first electrode layer; forming a first matrix on the first electrode layer; forming a plurality of grooves on the first matrix; forming a second matrix in the grooves; and forming a second electrode layer on the first matrix and the second matrix, wherein shapes of the grooves enables total reflection of light which is at least partially incident from the second matrix or the first matrix to an interface between the second matrix and the first matrix.

For example, the manufacturing method provided by an embodiment of the present disclosure further includes forming a filter layer on a side of the first matrix and the second matrix, which side is closer to the first electrode layer or closer to the second electrode layer.

For example, in the manufacturing method provided by an embodiment of the present disclosure, the plurality of the grooves are formed on the first matrix by a laser process or an etching process.

BRIEF DESCRIPTION OF THE DRAWINGS

In order to clearly illustrate the technical solution of the embodiments of the present disclosure, the embodiments or the drawings of the related technical description will be briefly described in the following, it is obvious that the described drawings are only related to some embodiments of the present disclosure and thus are not limitative of the present disclosure.

DETAILED DESCRIPTION

Figure 1:
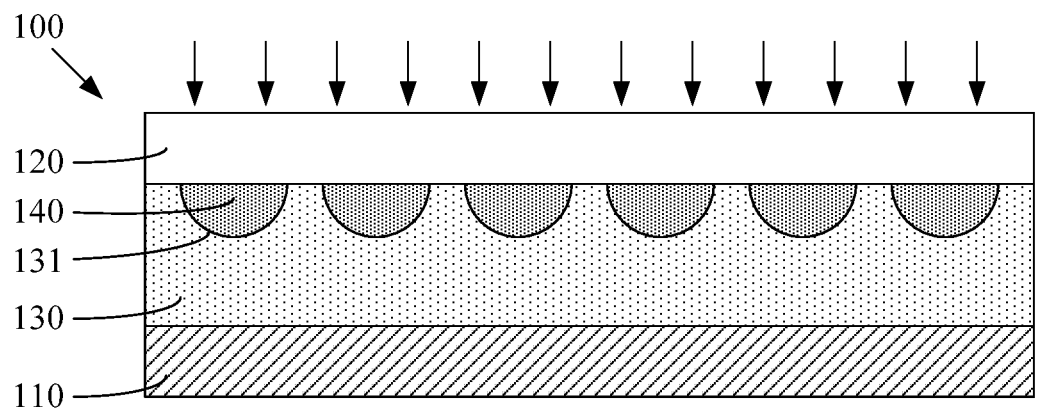
FIG. 1 is a first cross-sectional view illustrating a display panel according to an embodiment of the present disclosure.

The technical solutions according to an embodiment of the present disclosure will be described in a clearly and fully understandable way in connection with the drawings. Referring to the non-limiting exemplary embodiments shown in the drawings and detailed in the following description, the exemplary embodiments of the present disclosure and various features and advantageous details of the exemplary embodiments of the present disclosure are described more fully. It should be noted that the features shown in the figures are drew not necessarily according to scale. The present disclosure has omitted descriptions of well-known materials, assemblies, and process technologies so as not to obscure the exemplary embodiments of the present disclosure. The examples presented are merely intended to facilitate an understanding of the embodiments of the exemplary embodiments of the present disclosure and to further enable those skilled in the art to practice the exemplary embodiments. Therefore, these examples should not be construed as limiting the scope of the embodiments of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. In addition, in each embodiment of the present disclosure, the same or similar reference numerals denote the same or similar components.

A liquid crystal display panel realizes image display by utilizing the optical anisotropy of liquid crystal molecules, which requires that the liquid crystal display needs to be provided with structures such as polarizers and liquid crystal alignment layers and so on, and these structures may cause certain optical loss.

The display panel and the display device provided by an embodiment of the present disclosure realize the display by adjusting the cooperation of refractive indices of the first matrix and the second matrix to control the degree of total reflection of light, which improves display uniformity and improves display effect.

An embodiment of the present disclosure provides a display panel 100, as shown in FIG. 1, the display panel 100 comprises: a first electrode layer 110 and a second electrode layer 120, which are disposed to at least partially overlap with each other; a first matrix 130 with comprises a plurality of grooves 131 and disposed between the first electrode layer 110 and the second electrode layer 120; and a second matrix 140, disposed in the grooves 131 of the first matrix 130. The grooves 131 are shaped so as to enable total reflection of light which is incident at least partially perpendicular to the first electrode layer 110 or the second electrode layer 120 and incident from the second matrix 140 to the interface between the second matrix 140 and the first matrix 130.

It should be noted that the embodiments of the present disclosure include, but are not limited to, the situation that light is incident from the second matrix 140 to the interface between the second matrix 140 and the first matrix 130, light also can be incident from the first matrix 130 to the interface between the second matrix 140 and the first matrix 130.

For example, when light is incident from one side where the first electrode layer 110 is located, the first electrode layer 110 is a transparent conductive layer so that the incident light can pass through the first electrode layer 110. For example, in this case, the first electrode layer 110 may be made of a transparent conductive material such as indium tin oxide (ITO), indium zinc oxide (IZO) or the like.

For example, when light is incident from one side where the second electrode layer 120 is located, the second electrode layer 120 is a transparent conductive layer so that the incident light can pass through the second electrode layer 120. For example, in this case, the second electrode layer 120 may be made of a transparent conductive material such as indium tin oxide (ITO), indium zinc oxide (IZO) or the like.

Figure 2A:
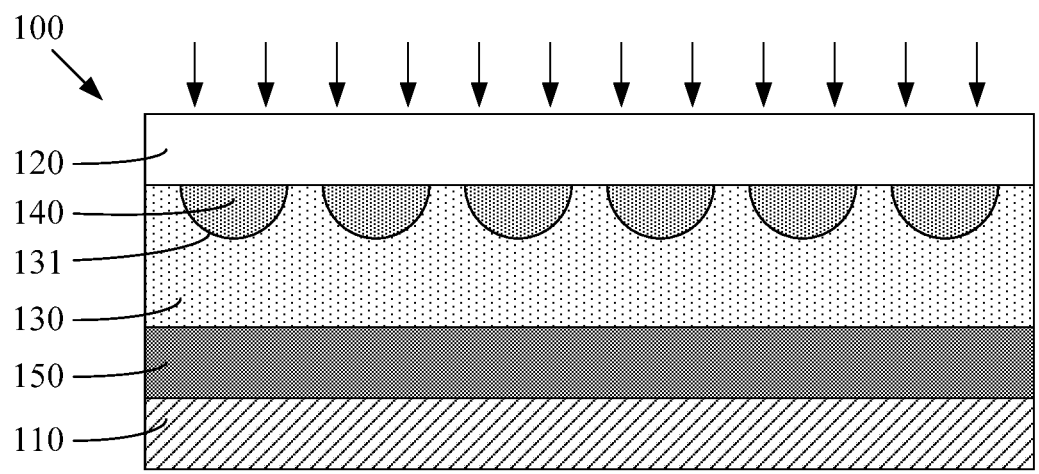
FIG. 2a is a second cross-sectional view illustrating a display panel according to an embodiment of the present disclosure.

For example, as shown in FIG. 2a, in one example, the display panel 100 provided by an embodiment of the present disclosure may further include a filter layer 150, and the filter layer 150 is disposed on the side of the first matrix 130 and the second matrix 140, which side is closer to the first electrode layer 110 or closer to the second electrode layer 120. For example, in the case shown in FIG. 2a, the filter layer 150 is disposed between the first matrix 130 and the first electrode layer 110, that is disposed on the side of the first matrix 130 and the second matrix 140 closer to the first electrode layer 110. It should be noted that the embodiments of the present disclosure include, but are not limited to, that the filter layer 150 is disposed between the first matrix 130 and the first electrode layer 110; when the first electrode layer 110 is a transparent electrode layer, the filter layer 150 may be disposed on the side of the first electrode layer 110, which side is away from the first matrix 130. For example, the filter layer 150 can improve the display contrast of the display panel 100 and improve the display effect, or is used to achieve color display.

For example, in the display panel 100 provided in the embodiments of the present disclosure, the first matrix 130 is made of a first electro-optical material and the second matrix 140 is made of a fixed refractive material; or the first matrix 130 is made of a fixed refractive index material and the second matrix 140 is made of a first electro-optical material. The first electro-optical material is configured to change its refractive index in operation according to the change of the voltage difference between the first electrode layer 110 and the second electrode layer 120. That is to say, when the display panel 100 is in operation, a voltage needs to be applied to the first electrode layer 110 and/or the second electrode layer 120 to generate a corresponding electric field, and the magnitude of the electric field is adjusted by changing the applied voltage of the first electrode layer 110 and/or the second electrode layer 120 (that is, changing the voltage difference between the first electrode layer 110 and the second electrode layer 120), so that the refractive index of the first electro-optical material can be changed.

For example, in the display panel 100 provided in the embodiments of the present disclosure, the first electro-optical material comprises any one or any combination of lithium niobate (LiNbO3), aluminum gallium arsenide (Al-GaAs), lead lanthanum zirconate titanate (PLZT) or other ceramic material or dendrimer, thiophene multimer and other organic electro-optical materials.

For example, the first electro-optical material in the embodiments of the present disclosure includes, but is not limited to the above materials, and it can also be other electro-optical material whose refractive index changes by changing the voltage difference applied across both sides thereof.

For example, the fixed refractive index material comprises any one or any combination of organic polymer, silicon oxide, silicon nitride, or silicon oxynitride.

For example, the fixed refractive index material in the embodiments of the present disclosure includes, but is not limited to the above materials, and it can also be other fixed refractive index material.

For example, in another example, the first matrix 130 is made of the first electro-optical material and the second matrix 140 is made of a second electro-optical material, and the first electro-optical material and the second electro-optical material are each configured to change its refractive index in operation according to the change of the voltage difference between the first electrode layer and the second electrode layer, and the refractive indices of the first and the second electro-optical materials change by different degrees for a same voltage difference. In this case, the degree of response to the voltage difference applied across both sides of the first electro-optical material which forms the first matrix 130 is different from the degree of response to the voltage difference applied across both sides of the second electro-optical material which forms the second matrix 140, so the refractive indices of the first and the second electro-optical materials change by different degrees, that is to say, the difference between the first refractive index of the first matrix 130 and the second refractive index of the second matrix layer 140 is changed by changing the voltage difference between the first electrode layer 110 and the second electrode layer 120.

For example, in the display panel 100 provided in the embodiments of the present disclosure, the second electro-optical material comprises any one or any combination of lithium niobate (LiNbO3), aluminum gallium arsenide (Al-GaAs), lead lanthanum zirconate titanate (PLZT) or other ceramic materials or dendrimer, thiophene multimer or other organic electro-optical materials.

Figure 3:
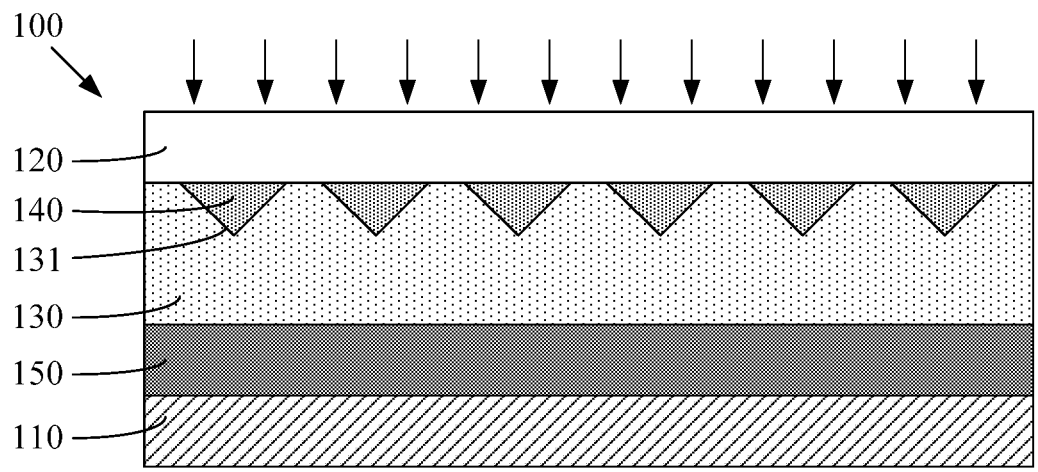
FIG. 3 is a fourth cross-sectional view illustrating a display panel according to an embodiment of the present disclosure.

For example, as shown in FIG. 2a and FIG. 3, in the display panel 100 provided in the embodiments of the present disclosure, when the grooves 131 are disposed on a side of the first matrix 130 closer to the second electrode layer 120, a cross-sectional area of each groove 131 is decreased in a direction perpendicular to the first electrode layer 110 or the second electrode layer 120 and from the second electrode layer 120 toward the first electrode layer 110. The cross-sectional area refers to an area obtained by cutting the groove 131 in a direction parallel to the first electrode layer 110 or the second electrode layer 120. That is to say, the cross-sectional area of the groove 131 monotonically decreases in a top-to-bottom direction in FIG. 2a or FIG. 3.

Figure 2B:
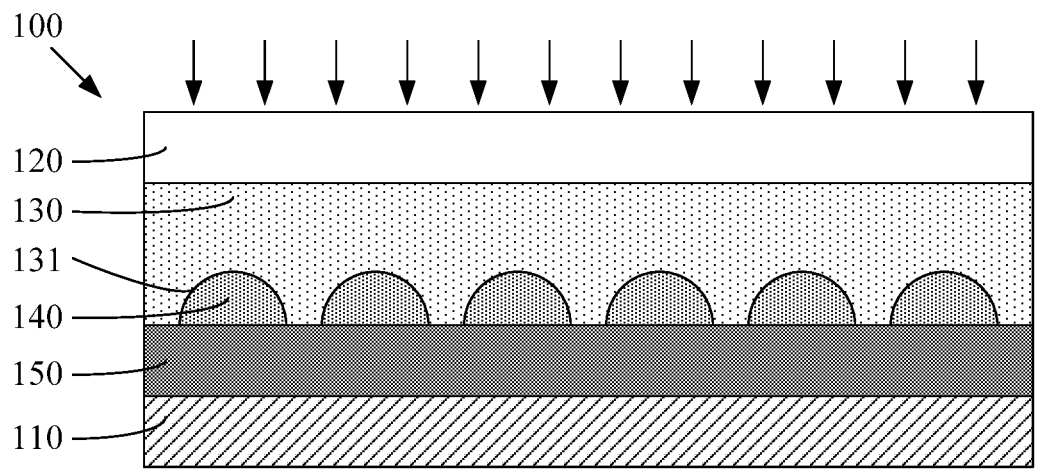
FIG. 2b is a third cross-sectional view illustrating a display panel according to an embodiment of the present disclosure.

For example, as shown in FIG. 2b, when the grooves 131 are disposed on a side of the first matrix 130 closer to the first electrode layer 110, a cross-sectional area of each groove 131 is decreased in a direction perpendicular to the first electrode layer 110 or the second electrode layer 120 and from the first electrode layer 110 toward the second electrode layer 120. That is to say, the cross-sectional area of the groove 131 monotonically decreases in a bottom-to-top direction in FIG. 2b.

For example, in the display panel 100 provided in the embodiments of the present disclosure, the shapes of the grooves 131 comprise hemisphere, cone, triangular prism, ellipsoid or partial hemisphere. For example, the shapes of the grooves 131 shown in FIG. 2a and FIG. 2b are hemispheres, and the shapes of the grooves 131 shown in FIG. 3 are cones.

For example, the shapes of the grooves 131 in the embodiments of the present disclosure include, but are not limited to the above shapes, other shapes that enable total reflection of light which is at least partially incident from the first matrix 130 or the second matrix 140 to the interface between the second matrix 140 and the first matrix 130 are also acceptable. For example, the shape of each groove 131 may also be a part of a parabola or an irregular shape.

For example, the following description takes the case that the grooves 131 are disposed on a side of the first matrix 130 closer to the second electrode layer 120 and the shapes of the grooves 131 are hemispheres as an example to illustrate.

Figure 4:
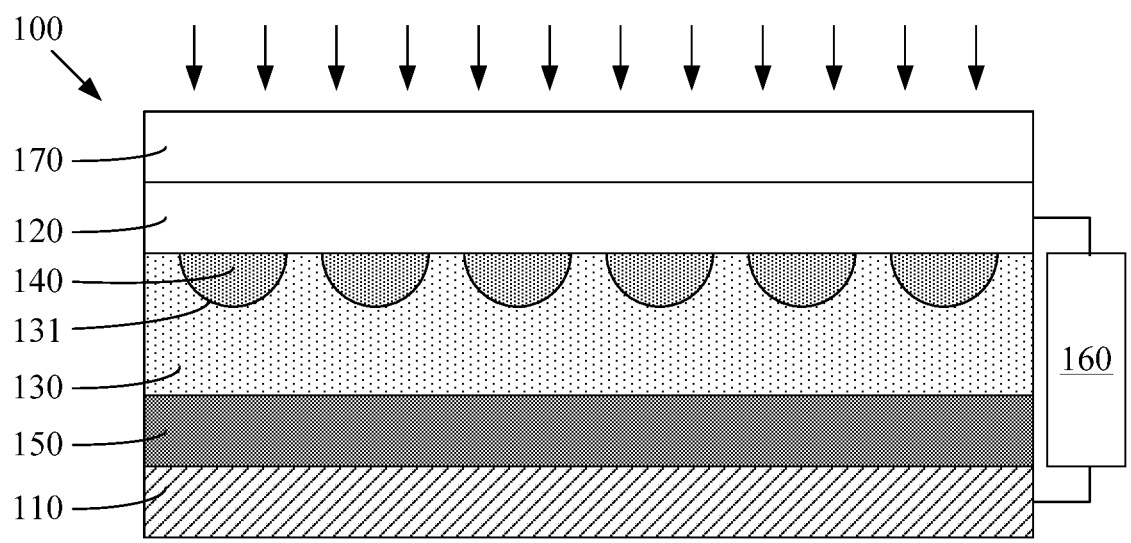
FIG. 4 is a fifth cross-sectional view illustrating a display panel according to an embodiment of the present disclosure.

For example, as shown in FIG. 4, the display panel 100 provided in the embodiment of the present disclosure further comprises a voltage control circuit 160, and the voltage control circuit 160 is connected to the first electrode layer 110 and the second electrode layer 120 and is configured to apply a first voltage to the first electrode layer 110 and a second voltage to the second electrode layer 120.

For example, as shown in FIG. 4, the display panel 100 provided in the embodiment of the present disclosure may further comprise an incident substrate 170, and the incident substrate 170 is a transparent substrate and is disposed on a light incident side of the display panel. The second electrode layer 120 may be disposed on the incident substrate 170, and then the incident substrate provided with the second electrode layer 120 is disposed on the first matrix 130 and the second matrix 140 to form the display panel 100.

For example, as shown in FIG. 4, in the display panel 100 provided in the embodiment of the present disclosure, the filter layer 150 is a black filter layer 150, and the black filter layer 150 is disposed on the side of the first matrix 130 and the second matrix 140, which side is closer to the first electrode layer 110.

For example, taking the case as shown in FIG. 4 as an example, the degree of total reflection of the incident light on the interface between the first matrix 130 and the second matrix 140 can be controlled by changing the difference of refractive index between the first matrix 130 and the second matrix 140. When the second refractive index of the second matrix 140 is equal to or closer to the first refractive index of the first matrix 130, the incident light does not undergo total reflection, and the incident light is irradiated on the black filter 150, and a black display image can seen when a user views from the light incident side of the display panel (that is the side of the second electrode layer 120 away from the first electrode layer 110); when the second refractive index of the second matrix 140 is greater than the first refractive index of the first matrix 130, partial incident light undergoes total reflection on the interface between the first matrix 130 and the second matrix 140, and the greater the difference between the second refractive index and the first refractive index, the more total reflection light, and a white display image with a certain degree of grayscale can be seen when the user views from the light incident side of the display panel. Black and white grayscale image can be achieved in reflective display.

Figure 5:
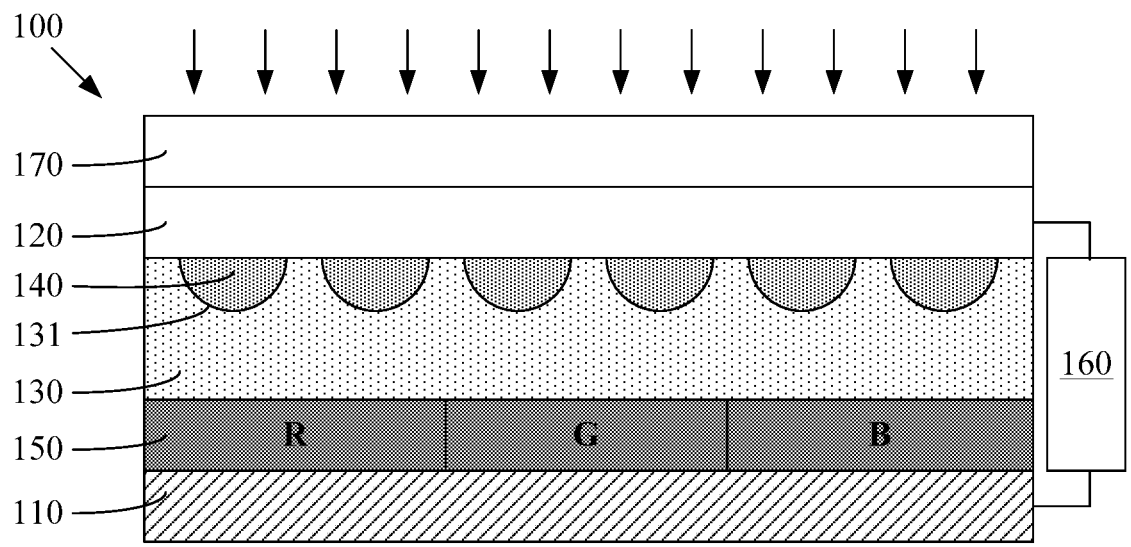
FIG. 5 is a sixth cross-sectional view illustrating a display panel according to an embodiment of the present disclosure.
Figure 6:
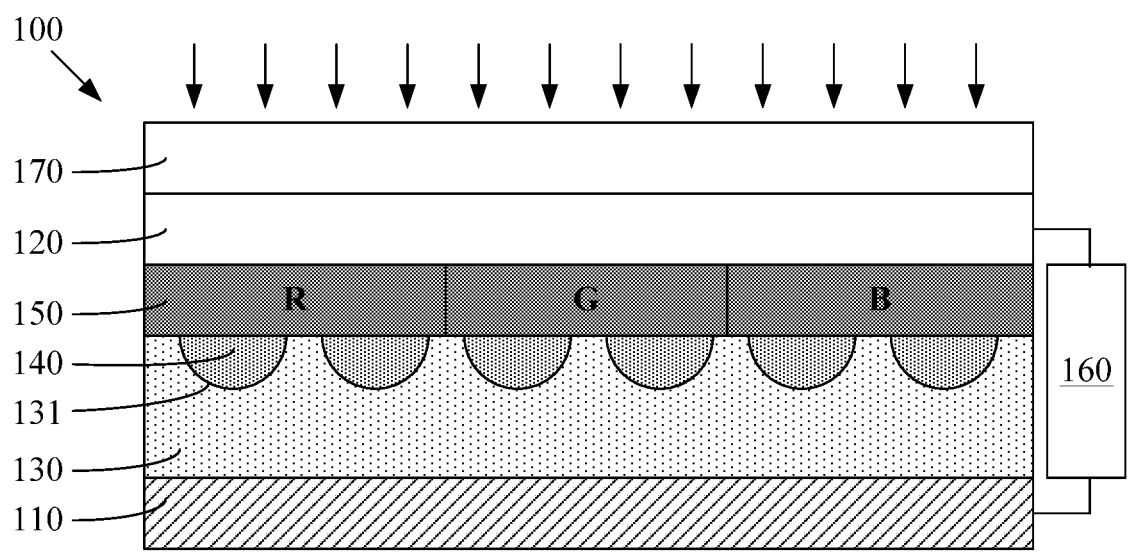
FIG. 6 is a seventh cross-sectional view illustrating a display panel according to an embodiment of the present disclosure.

For example, as shown in FIG. 5 and FIG. 6, in the display panel 100 provided in the embodiments of the present disclosure, the filter layer 150 is a patterned color filter layer 150, and the color filter layer 150 is disposed on the side of the first matrix 130 and the second matrix 140 closer to the first electrode layer 110 or closer to the second electrode layer 120.

For example, the patterned color filter layer 150 comprises a plurality of color filter units, and the color filter layer 150 as shown in FIG. 5 and FIG. 6 comprises a red filter unit (R), a green filter unit (G), and a blue filter unit (B).

It should be noted that the patterned color filter layer 150 includes, but is not limited to, the red filter unit (R), the green filter unit (G) and the blue filter unit (B), and it can also include any combination having other color filter unit. The kinds of the filter units are not limited to three kinds, and, for example, the color filter layer 150 may also include four kinds of filter units such as the red filter unit (R), the green filter unit (G), the blue filter unit (B), and a yellow filter unit.

For example, the color filter layer 150 as shown in FIG. 5 is disposed on the side of the first matrix 130 and the second matrix 140 closer to the first electrode layer 110; and the color filter layer 150 as shown in FIG. 6 is disposed on the side of the first matrix 130 and the second matrix 140 closer to the second electrode layer 120.

For example, as shown in FIG. 5 and FIG. 6, in the display panel 100 provided in the embodiments of the present disclosure, when the display panel 100 is a reflective display panel, the first electrode layer 110 is, for example, a metal electrode layer for reflecting the incident light.

For example, the first electrode layer 110 may also be a transparent conductive layer. For example, the first electrode layer 110 may be made of a transparent conductive material such as indium tin oxide (ITO) or indium zinc oxide (IZO).

Figure 7:
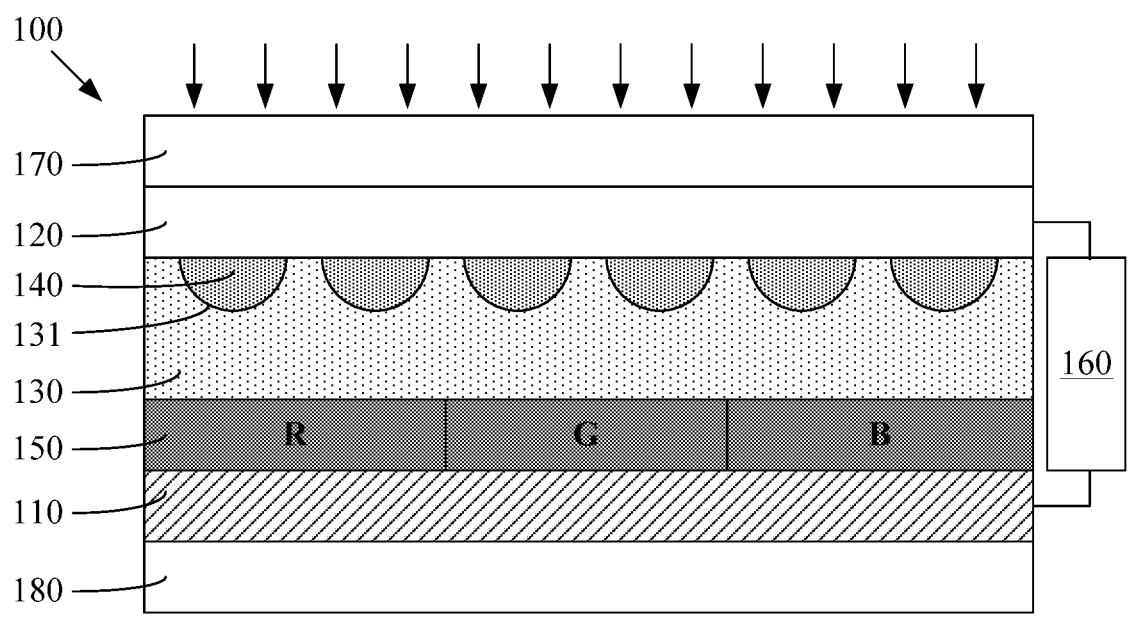
FIG. 7 is an eighth cross-sectional view illustrating a display panel according to an embodiment of the present disclosure.

For example, as shown in FIG. 7, the display panel 100 provided in the embodiment of the present disclosure may further include a first substrate 180, and the first electrode layer 110 is disposed on the side of the first substrate 180 closer to the second electrode layer 120.

For example, when the display panel 100 is a transparent display panel, the first electrode layer 110 is a transparent conductive layer, and the first substrate 180 is a transparent substrate.

For example, when the display panel 100 is a reflective display panel and the first electrode layer 110 is a transparent conductive layer, the first substrate 180 is a light-reflective substrate (for example an opaque substrate, such as a metal substrate).

Figure 8:
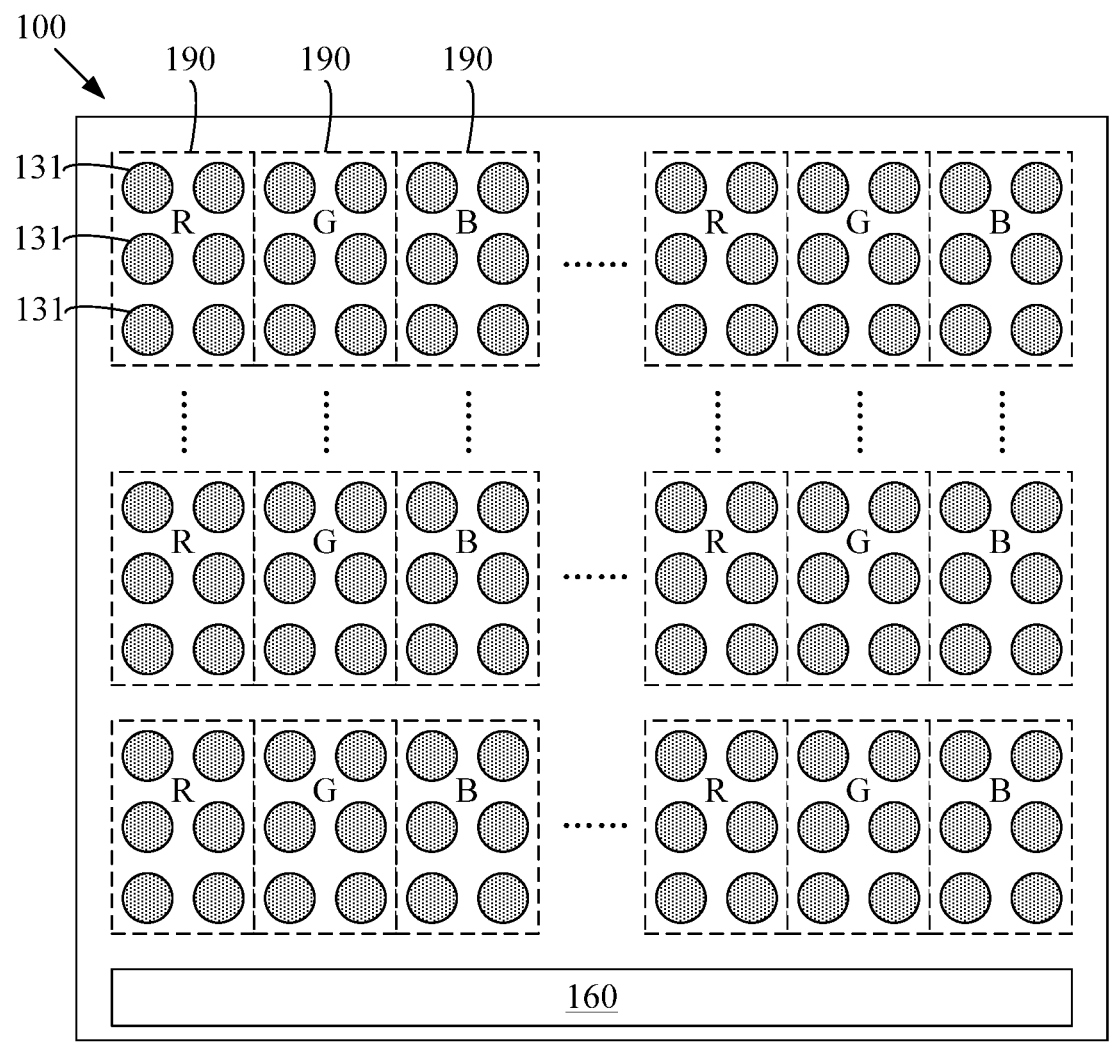
FIG. 8 is a top view illustrating a display panel according to an embodiment of the present disclosure.

The electrodes of the display panel 100 provided in the embodiments of the present disclosure may be arranged in a code segment or a dot matrix, and the latter may be further classified into a passive matrix type and an active matrix type. For example, as shown in FIG. 8, in one example, the display panel includes a plurality of sub-pixel regions 190 arranged in an array, and each of the sub-pixel regions 190 corresponds to one color of the color filter layer 150 (for example, red R, green G or blue B).

For example, each of the sub-pixel regions may include the layer structures such as a first electrode layer, a second electrode layer, a first matrix, a second matrix, a filter layer and so on which are on the display panel.

For example, each of the sub-pixel regions 190 corresponds to at least one groove 131. It should be noted that the number of the grooves 131 corresponding to the sub-pixel regions 190 and the distribution density of the grooves 131 are not limited to those as shown in FIG. 8, the ratio of number and the ratio of size between the sub-pixel regions 190 and the grooves 131 can be set as desired. For example, in order to increase contrast and resolution, the grooves in the first matrix may be formed as close to each other as possible to reduce the empty areas between the grooves.

Figure 9:
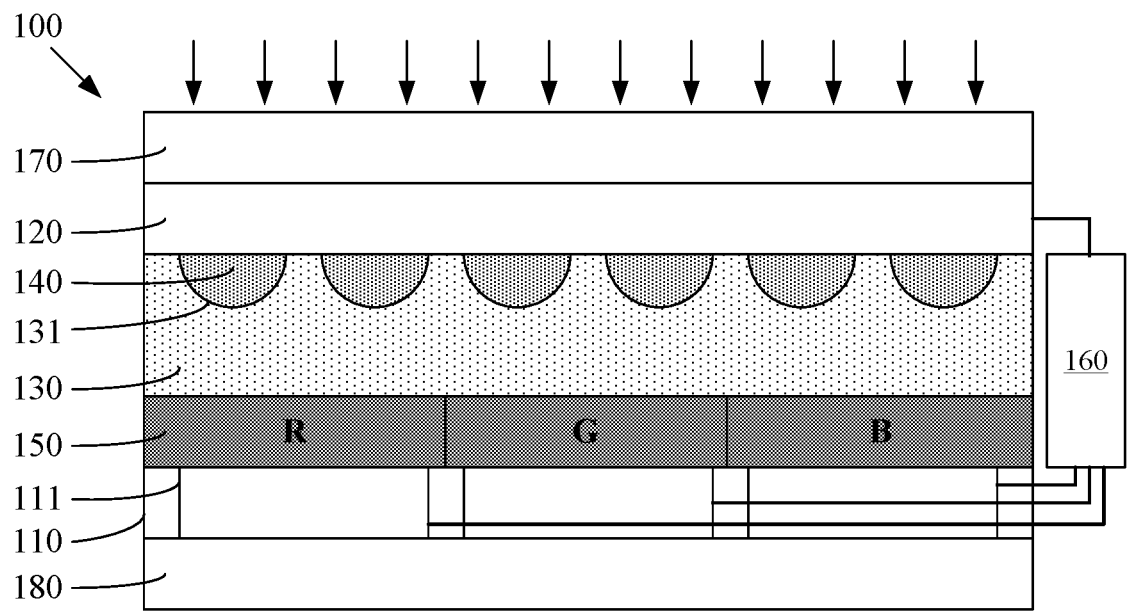
FIG. 9 is a ninth cross-sectional view illustrating a display panel according to an embodiment of the present disclosure.
Figure 10:
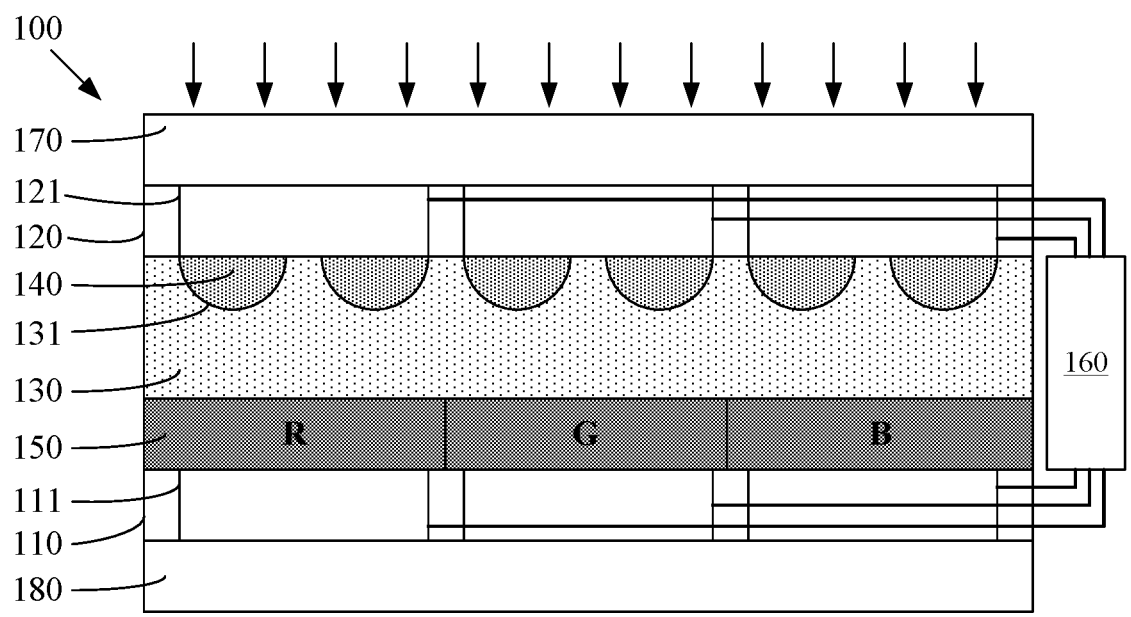
FIG. 10 is a tenth cross-sectional view illustrating a display panel according to an embodiment of the present disclosure.

For example, as shown in FIG. 9 and FIG. 10, the first electrode layer 110 includes a plurality of first sub-electrodes 111 and/or the second electrode layer 120 includes a plurality of second sub-electrodes 121, and each sub-pixel region 190 corresponds to one first sub-electrode 111 and/or each sub-pixel region 190 corresponds to one second sub-electrode 121.

For another example, each of the sub-pixel regions may include a driving circuit such as a thin film transistor (TFT) to apply different data voltages to the first sub-electrode 111 and/or the second sub-electrode 121 of the sub-pixel, thus each sub-pixel is controlled individually. For this kind of active matrix driving manner, the display panel may further include a gate driving circuit and a data driving circuit, so as to be able to operate in a manner such as line-by-line scanning.

For example, the first sub-electrodes 111 are insulated from each other; the second sub-electrodes 121 are insulated from each other.

For example, in the display panel of the embodiment shown in FIG. 9, the first electrode layer 110 includes a plurality of first sub-electrodes 111 each in a block shape, and the first sub-electrodes 111 correspond to the sub-pixel regions 190 in one-to-one correspondence, that is to say, each of the first sub-electrode 111 corresponds to one filter unit of one color filter layer, and the second electrode layer 120 is a planar electrode as a whole, the first sub-electrodes 111 are respectively connected to the voltage control circuit 160 and can receive control voltages provided by the voltage control circuit 160 respectively. In this case, voltages can be respectively applied to the plurality of first sub-electrodes 111 to adjust the differences of the refractive indices between the first matrix 130 and the second matrix 140 in the sub-pixel regions 190 corresponding to the plurality of first sub-electrodes 111.

For example, in the display panel of the embodiment shown in FIG. 10, the first electrode layer 110 includes a plurality of first sub-electrodes 111 each in a block shape, and the second electrode layer 120 includes a plurality of second sub-electrodes 121 each in a block shape, the first sub-electrodes 111 and the second sub-electrodes 121 correspond to the sub-pixel regions 190 in one-to-one correspondence, the first sub-electrodes 111 and the second sub-electrodes 121 are respectively connected to the voltage control circuit 160 and receive control voltages provided by the voltage control circuit 160. In this case, voltages can be respectively applied to the plurality of first sub-electrodes 111 and the plurality of second sub-electrodes 121 to adjust the differences of the refractive indices between the first matrix 130 and the second matrix 140 in the sub-pixel regions 190 corresponding to the first sub-electrodes 111 and the second sub-electrodes 121.

For example, in another example, the first sub-electrodes are strip-shaped electrodes and each corresponds to a row of the sub-pixel regions; and the second sub-electrodes are also strip-shaped electrodes and each corresponds to a column of the sub-pixel regions. For example, in the embodiments of the present disclosure, or, the first sub-electrodes are strip-shaped electrodes and each corresponds to a column of the sub-pixel regions, and the second sub-electrodes are also strip-shaped electrodes and each corresponds to a row of the sub-pixel regions. In this case, the first and the second sub-electrodes may be driven by a manner such as passive matrix driving.

For example, the embodiments of the present disclosure include, but are not limited to the above cases, it can also be the case that the second electrode layer 120 includes a plurality of second sub-electrodes 121 each in a block shape, and the second sub-electrodes 121 correspond to the sub-pixel regions 190 in one-to-one correspondence, and the first electrode layer 110 is a planar electrode as a whole.

For example, voltages can be applied to the first matrix 130 and the second matrix 140 in the sub-pixel regions 190 corresponding to different colors by the first sub-electrodes 111 corresponding to the sub-pixel regions 190 in one-to-one correspondence and/or the second sub-electrodes 121 corresponding to the sub-pixel regions 190 in one-to-one correspondence, thus the voltage differences between the first matrix 130 and the second matrix 140 in the sub-pixel regions 190 corresponding to different colors are controlled, thus the differences between the refractive indexes of the first matrix 130 and the second matrix 140 in the sub-pixel regions 190 are changed, and then the degrees of total reflection of the incident light (that is the intensity of transmission or the reflection of the incident light) in the sub-pixel regions 190 corresponding to different colors are adjusted, and a color display with adjustable colors of the display panel 100 is realized.

It should be noted that, in each embodiment described above in combination with FIG. 1 to FIG. 10, the grooves for accommodating the second matrix can be disposed on the side of the first matrix closer to the light incident, or can also be disposed on the side of the first matrix away from the light incident, as long as the incident light is controllably and at least partially total reflection at the contact surface (interface) between the first matrix and the second matrix.

Figure 11:
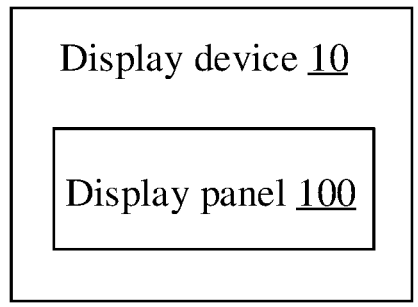
FIG. 11 is an illustration of a display device according to an embodiment of the present disclosure.

An embodiment of the present disclosure further provides a display device 10, as shown in FIG. 11, the display device 10 includes the display panel 100 provided by any one embodiment of the present disclosure.

For example, the display device provided in the embodiments of the present disclosure may include any products or components with display function, such as a mobile phone, a tablet, a television, a display, a notebook computer, a digital photo frame, and a navigator and so on.

Figure 12:
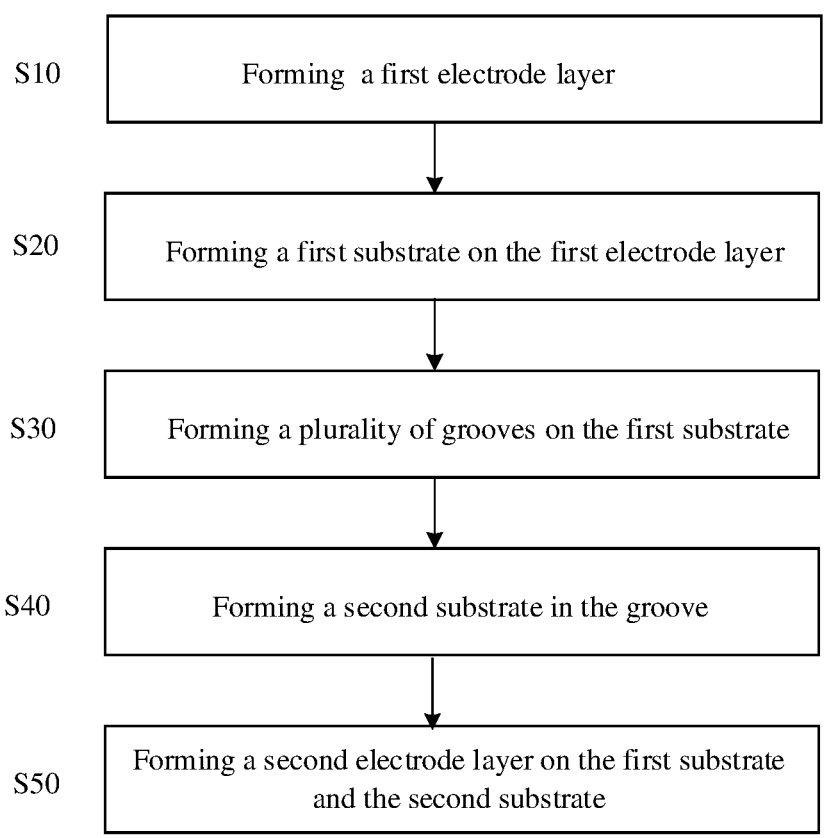
FIG. 12 is a flowchart of a method for manufacturing a display panel according to an embodiment of the present disclosure.

An embodiment of the present disclosure further provides a method for manufacturing the display panel 100. As shown in FIG. 12, the method includes the following steps.

Step S10: forming a first electrode layer 110;
Step S20: forming a first matrix 130 on the first electrode layer 110;
Step S30: forming a plurality of grooves 131 in the first matrix 130;
Step S40: forming a second matrix 140 in the grooves 131; and
Step S50: forming a second electrode layer 120 on the first matrix 130 and the second matrix 140.

For example, the grooves are shaped so as to enable total reflection of light which is at least partially incident from the second matrix 140 or the first matrix 130 to an interface of the second matrix 140 and the first matrix 130.

For example, the first electrode layer can be formed on the first matrix.

For example, the plurality of grooves 131 can be formed on the first matrix 130 by a laser process or an etching process, and the first matrix 130 comprising the grooves can also be prepared by embossing, or the like, which facilitates the morphology control of the grooves 131.

For example, after the second matrix 140 is filled within the grooves 131, the grooves 131 can be flatted by using methods such as chemical mechanical polishing, etching, or the like, which facilitates the morphology control of the second matrix 140.

For example, the first matrix can be prepared directly on the first electrode layer, and then the second matrix can be filled in the grooves which are disposed on the first matrix; or, after obtaining the first matrix whose grooves are filled with the second matrix, and then the first matrix is attached to the first electrode.

For example, forming of the second electrode layer 120 on the first matrix 130 and the second matrix 140 can be the case that the second electrode layer 120 is directly formed on the first matrix 130 and the second matrix 140, or, the case that the second electrode layer 120 is formed on the incident substrate and then the incident substrate is disposed on the first matrix 130 and the second matrix 140.

For example, the manufacturing method provided by the embodiments of the present disclosure may further include forming a filter layer 150 on the side of the first matrix 130 and the second matrix 140 closer to the first electrode layer 110 or closer to the second electrode layer 120.

For example, as described above, the filter layer 150 may be a black filter layer or a patterned color filter layer.

The display panel and the display device provided by the embodiments of the present disclosure achieve display by adjusting the cooperation of the refractive indices of the first matrix and the second matrix to control the degree of total reflection of light, which improves the display uniformity and improves the display effect.

Although the present disclosure has been described in detail with the general description and specific embodiments hereinbefore, it is obvious to those skilled in the art that the disclosure may be modified or improved based on the embodiments of the disclosure. Therefore, all such modifications or improvements made without departing from the spirit of the present disclosure all fall within the protection scope of the present disclosure.

The application claims priority to the Chinese patent application No. 201610967160.2, filed on Oct. 28, 2016, the entire disclosure of which is incorporated herein by reference as part of the present application.

What is claimed is:

1. A display panel comprising:
   a first electrode layer and a second electrode layer, which are disposed to at least partially overlap with each other;
   a first matrix comprising a plurality of grooves and disposed between the first electrode layer and the second electrode layer; and
   a second matrix, disposed in the grooves of the first matrix;
   wherein the grooves are shaped so as to enable total reflection of light which is incident at least partially perpendicular to the first electrode layer or the second electrode layer and incident from the second matrix or the first matrix to an interface between the second matrix and the first matrix, at least one of the first electrode layer and the second electrode layer is a transparent conductive layer, and
   at least one of the first matrix and the second matrix is configured to change a refractive index of the at least one of the first matrix and the second matrix in operation according to a change of a voltage difference between the first electrode layer and the second electrode layer.

2. The display panel according to claim 1, wherein
   one of the first matrix and the second matrix is made of the first electro-optical material and the other of the first matrix and the second matrix is made of a second electro-optical material, and the first electro-optical material and the second electro-optical material are configured to change refractive indices of the first and the second electro-optical materials in operation according to the change of the voltage difference between the first electrode layer and the second electrode layer, and the refractive indices of the first and the second electro-optical materials change by different degrees for a same voltage difference.

3. The display panel according to claim 2, wherein the first electro-optical material comprises any one or any combination of lithium niobate, aluminum gallium arsenide, lead lanthanum zirconate titanate, dendrimer, or thiophene multimer; and the second electro-optical material comprises any one or any combination of lithium niobate, aluminum gallium arsenide, lead lanthanum zirconate titanate, dendrimer, or thiophene multimer.

4. The display panel according to claim 2, wherein
   the grooves are disposed on a side of the first matrix closer to the second electrode layer, and a cross-sectional area of each groove is decreased in a direction perpendicular to the first electrode layer or the second electrode layer and from the second electrode layer toward the first electrode layer; or,
   the grooves are disposed on a side of the first matrix closer to the first electrode layer, and a cross-sectional area of each groove is decreased in a direction perpendicular to the first electrode layer or the second electrode layer and from the first electrode layer toward the second electrode layer.

5. The display panel according to claim 2, further comprising a filter layer, wherein the filter layer is disposed on a side of the first matrix and the second matrix, which side is closer to the first electrode layer or closer to the second electrode layer.

6. The display panel according to claim 2, comprising a plurality of sub-pixel regions arranged in an array, wherein
   the first electrode layer includes a plurality of first sub-electrodes each in a block shape, the second electrode layer is a planar electrode, and the first sub-electrodes correspond to the sub-pixel regions in one-to-one correspondence; or
   the second electrode layer includes a plurality of second sub-electrodes each in a block shape, the first electrode layer is a planar electrode, and the second sub-electrodes correspond to the sub-pixel regions in one-to-one correspondence; or
   the first electrode layer includes a plurality of first sub-electrodes each in a block shape, the second electrode layer includes a plurality of second sub-electrodes each in a block shape, the first sub-electrodes and the second sub-electrodes correspond to the sub-pixel regions in one-to-one correspondence; or
   the first electrode layer includes a plurality of strip-shaped first sub-electrodes, the second electrode layer includes a plurality of strip-shaped second sub-electrodes, and each of the first sub-electrodes corresponds to a row of the sub-pixel regions, and each of the second sub-electrodes corresponds to a column of the sub-pixel regions; or
   the first electrode layer includes a plurality of strip-shaped first sub-electrodes, the second electrode layer includes a plurality of strip-shaped second sub-electrodes, and each of the first sub-electrodes corresponds to a column of the sub-pixel regions, and each of the second sub-electrodes corresponds to a row of the sub-pixel regions.

7. The display panel according to claim 1, wherein
the grooves are disposed on a side of the first matrix closer to the second electrode layer, and a cross-sectional area of each groove is decreased in a direction perpendicular to the first electrode layer or the second electrode layer and from the second electrode layer toward the first electrode layer; or,
the grooves are disposed on a side of the first matrix closer to the first electrode layer, and a cross-sectional area of each groove is decreased in a direction perpendicular to the first electrode layer or the second electrode layer and from the first electrode layer toward the second electrode layer.

8. The display panel according to claim 7, wherein shapes of the grooves comprise hemisphere, cone, triangular prism, ellipsoid or partial hemisphere.

9. The display panel according to claim 1, further comprising a filter layer, wherein the filter layer is disposed on a side of the first electrode layer or the second electrode layer, which side is closer to the first matrix and the second matrix.

10. The display panel according to claim 9, wherein the filter layer is a black filter layer, and the black filter layer is disposed on a side of the first matrix and the second matrix, which side is closer to the first electrode layer.

11. The display panel according to claim 9, wherein the filter layer is a patterned color filter layer, and the color filter layer is disposed on a side of the first matrix and the second matrix, which side is closer to the first electrode layer or closer to the second electrode layer.

12. The display panel according to claim 1, further comprising a voltage control circuit,
wherein the voltage control circuit is connected to the first electrode layer and the second electrode layer and is configured to apply a first voltage to the first electrode layer and a second voltage to the second electrode layer respectively.

13. The display panel according to claim 1, comprising a plurality of sub-pixel regions arranged in an array, wherein
the first electrode layer includes a plurality of first sub-electrodes each in a block shape, the second electrode layer is a planar electrode, and the first sub-electrodes correspond to the sub-pixel regions in one-to-one correspondence; or
the second electrode layer includes a plurality of second sub-electrodes each in a block shape, the first electrode layer is a planar electrode, and the second sub-electrodes correspond to the sub-pixel regions in one-to-one correspondence; or
the first electrode layer includes a plurality of first sub-electrodes each in a block shape, the second electrode layer includes a plurality of second sub-electrodes each in a block shape, the first sub-electrodes and the second sub-electrodes correspond to the sub-pixel regions in one-to-one correspondence; or the first electrode layer includes a plurality of strip-shaped first sub-electrodes, the second electrode layer includes a plurality of strip-shaped second sub-electrodes, and each of the first sub-electrodes corresponds to a row of the sub-pixel regions, and each of the second sub-electrodes corresponds to a column of the sub-pixel regions; or
the first electrode layer includes a plurality of strip-shaped first sub-electrodes, the second electrode layer includes a plurality of strip-shaped second sub-electrodes, and each of the first sub-electrodes corresponds to a column of the sub-pixel regions, and each of the second sub-electrodes corresponds to a row of the sub-pixel regions.

14. The display panel according to claim 13, wherein each of the sub-pixel regions corresponds to at least one of the grooves.

15. A display device comprising the display panel according to claim 1.

16. The display panel according to claim 1, wherein one of the first matrix and the second matrix is made of a first electro-optical material and the other of the first matrix and the second matrix is made of a fixed refractive index material, and the first electro-optic material is configured to change the refractive index of the first electro-optic material in operation according to the change of the voltage difference between the first electrode layer and the second electrode layer.

17. The display panel according to claim 16, wherein the first electro-optical material comprises any one or any combination of lithium niobate, aluminum gallium arsenide, lead lanthanum zirconate titanate, dendrimer, or thiophene multimer; and the second electro-optical material comprises any one or any combination of lithium niobate, aluminum gallium arsenide, lead lanthanum zirconate titanate, dendrimer, or thiophene multimer.

18. A method for fabricating a display panel comprising:
forming a first electrode layer;
forming a first matrix on the first electrode layer;
forming a plurality of grooves on the first matrix;
forming a second matrix in the grooves; and
forming a second electrode layer on the first matrix and the second matrix,
wherein shapes of the grooves enable total reflection of light which is at least partially incident from the second matrix or the first matrix to an interface between the second matrix and the first matrix.

19. The method according to claim 18, further comprising:
forming a filter layer on a side of the first matrix and the second matrix, which side is closer to the first electrode layer or closer to the second electrode layer.

20. The method according to claim 18, wherein the grooves are formed on the first matrix by a laser process or an etching process.

* * * * *